United States Patent
Ma et al.

(10) Patent No.: US 10,963,789 B2
(45) Date of Patent: Mar. 30, 2021

(54) LONG-TERM MEMORY NETWORKS FOR KNOWLEDGE EXTRACTION FROM TEXT AND PUBLICATIONS

(71) Applicant: Xerox Corporation, Norwalk, CT (US)

(72) Inventors: Fenglong Ma, Amherst, NY (US); Radha Chitta, Webster, NY (US); Jing Zhou, Pittsford, NY (US); Palghat S. Ramesh, Pittsford, NY (US); Tong Sun, Penfield, NY (US); Saurabh Singh Kataria, Sunnyvale, CA (US)

(73) Assignee: Conduent Business Services, LLC, Florham Park, NJ (US)

( * ) Notice: Subject to any disclaimer, the term of this patent is extended or adjusted under 35 U.S.C. 154(b) by 1024 days.

(21) Appl. No.: 15/370,305

(22) Filed: Dec. 6, 2016

(65) Prior Publication Data

US 2018/0150743 A1    May 31, 2018

Related U.S. Application Data

(60) Provisional application No. 62/426,645, filed on Nov. 28, 2016.

(51) Int. Cl.
| | | |
|---|---|---|
| *G06N 5/02* | (2006.01) | |
| *G06N 5/04* | (2006.01) | |
| *G06F 17/27* | (2006.01) | |
| *G06K 9/62* | (2006.01) | |
| *G06N 3/08* | (2006.01) | |
| *G06N 3/04* | (2006.01) | |
| *G06N 3/063* | (2006.01) | |

(52) U.S. Cl.
CPC .......... *G06N 3/084* (2013.01); *G06N 3/0445* (2013.01); *G06N 3/063* (2013.01)

(58) Field of Classification Search
CPC ....... G06N 3/084; G06N 3/0445; G06N 3/063
USPC ...................................................... 706/1–62
See application file for complete search history.

(56) References Cited

U.S. PATENT DOCUMENTS

| | | | |
|---|---|---|---|
| 9,275,347 B1 | 3/2016 | Harada et al. | |
| 9,324,022 B2 | 4/2016 | Williams, Jr. et al. | |
| 10,013,640 B1 * | 7/2018 | Angelova | G06K 9/4628 |
| 10,223,617 B1 * | 3/2019 | Mnih | G06K 9/00456 |
| 10,388,274 B1 * | 8/2019 | Hoffmeister | G06F 16/24522 |
| 10,540,967 B2 * | 1/2020 | Perez | G06F 40/35 |
| 2014/0324472 A1 | 10/2014 | Delaney et al. | |
| 2015/0324525 A1 | 11/2015 | Saffran | |
| 2015/0324527 A1 | 11/2015 | Siegel et al. | |
| 2015/0370992 A1 | 12/2015 | Yao et al. | |
| 2016/0055420 A1 | 2/2016 | Karanam et al. | |
| 2016/0063182 A1 | 3/2016 | Srivastava et al. | |
| 2016/0162569 A1 | 6/2016 | Erle et al. | |
| 2016/0259857 A1 | 9/2016 | Wang et al. | |
| 2016/0306877 A1 | 10/2016 | Winther | |
| 2016/0314393 A1 | 10/2016 | Cook et al. | |

(Continued)

*Primary Examiner* — Brandon S Cole
(74) *Attorney, Agent, or Firm* — Ortiz & Lopez, PLLC; Kermit D. Lopez; Luis M. Ortiz

(57) ABSTRACT

A long-term memory network method and system for text comprehension. A recurrent neural network can be provided, which includes an external memory module and a long-short term memory unit, wherein said recurrent neural network encodes raw text information into vector representations, forms memories, finds relevant sentences to answer questions, and generates multi-word answers to said questions utilizing the long short term memory unit.

20 Claims, 4 Drawing Sheets

(56) References Cited

U.S. PATENT DOCUMENTS

| | | | |
|---|---|---|---|
| 2016/0350653 A1* | 12/2016 | Socher | G06N 5/04 |
| 2017/0024645 A1* | 1/2017 | Socher | G06F 16/3329 |
| 2017/0103324 A1* | 4/2017 | Weston | G06N 5/04 |
| 2017/0127016 A1* | 5/2017 | Yu | G06N 3/0445 |
| 2018/0067923 A1* | 3/2018 | Chen | G06F 40/30 |
| 2018/0121792 A1* | 5/2018 | Tristan | G06N 3/0445 |
| 2018/0157747 A1* | 6/2018 | Tiwary | G06N 3/08 |

* cited by examiner

```
1: Burrel's innovative design, which
combined the low production cost of an
Apple II with the computing power of
Lisa's CPU, the Motorola 68K, received
the attention of Steve Jobs, co-founder of
Apple.
2: Realizing that the Macintosh was more
marketable than the Lisa, he began to
focus his attention on the project.
3: Raskin left the team in 1981 over a
personality conflict with Jobs.
4: Why did Raskin leave the Apple team
in 1981? over a personality conflict with
Jobs
5: Team member Andy Hertzfeld said that
the final Macintosh design is closer to
Jobs' ideas than Raskin's.
6: According to Andy Hertzfeld, whose idea
is the final Mac design closer to? Jobs
7: After hearing of the pioneering GUI
technology being developed at Xerox PARC,
Jobs had negotiated a visit to see the
Xerox Alto computer and its Smalltalk
development tools in exchange for Apple
stock options.
8: What did Steve Jobs offer Xerox to
visit and see their latest technology?
Apple stock options
```

FIG. 1
PRIOR ART

LONG-TERM MEMORY NETWORKS FOR KNOWLEDGE EXTRACTION FROM TEXT AND PUBLICATIONS

CROSS-REFERENCE TO PROVISIONAL APPLICATION

This nonprovisional patent application claims priority to and the benefit under 35 U.S.C. § 119(e) of U.S. Provisional Patent Application Ser. No. 62/426,645 filed on Nov. 28, 2016, entitled "Long-Term Memory Networks for Knowledge Extraction from Text and Publications," which is incorporated herein by reference in its entirety.

TECHNICAL FIELD

Embodiments are generally related to the field of machine learning and deep learning. Embodiments also relate to improving machine learning and deep learning performance.

BACKGROUND

Knowledge extraction from documents such as PubMed articles is crucial to, for example, healthcare analytics tasks such as disease progression modeling and intervention modeling. This problem can be cast into a question answering problem with a fixed set of questions related to the disease or intervention being studied, whose answers can be found in the given article.

Question answering (QA), a challenging problem which requires an ability to understand and analyze the given unstructured text, is one of the core tasks in natural language understanding and processing. Many problems in natural language processing, such as reading comprehension, machine translation, entity recognition, sentiment analysis, and dialogue generation can be cast as question answering problems.

Traditional question answering approaches can be categorized as: IR-based question answering where the question is formulated as a search query and a short text segment is found on the Web or similar corpus for the answer; and knowledge-based question answering, which aims to answer a natural language question by mapping it to a semantic query over a database. The main drawback of traditional question answering approaches is that they cannot fully understand the meaning of the text information.

Traditional question answering approaches, which include IR-based and Knowledge based methods, thus formulate the question as a query over a corpus or a database. They cannot fully comprehend the meaning of the input text before generating the answer. Deep neural network architectures, like end-to-end memory networks, developed recently to understand, memorize, and reason over the text information, require a large amount of data, high supervision, and are limited to single-word answers.

To address these challenges, a Long-Term Memory Network (LTMN) is described herein, which can be configured to incorporate both an external memory (e.g., an external memory module) and a Long Short-Term Memory (LSTM) (e.g., LSTM module) to comprehend the input data, and generate multi-word answers. The LTMN discussed herein can be trained end-to-end using back-propagation and requires minimal supervision.

FIG. 1 illustrates an example of a question-answering task 10, in accordance with an example embodiment. The question-answering task 10 depicted in FIG. 1 includes a number of statements of facts and questions. The sentences in standard black are facts that may be relevant to the questions, the questions 12, 16, 20 are shown bolded, and the correct answers 14, 18, 22 are shown in grey. In order to correctly answer the question "What did Steve Jobs offer Xerox to visit and see their latest technology?", the model should have the ability to recognize that the sentence "After hearing of the pioneering GUI technology being developed at Xerox PARC, Jobs had negotiated a visit to see the Xerox Alto computer and its Smalltalk development tools in exchange for Apple stock option" is a supporting fact and completely understand its meaning. In addition, the model should have the ability to memorize all the facts that have been presented to it until the current time and deduce the answer.

A new class of learning models named Memory Networks (MemNN) was proposed, which use a long-term memory component to store information and an inference component for reasoning. Additionally, a Dynamic Memory Network (DMN) has been proposed for general question answering tasks, which processes input sentences and questions, forms episodic memories, and generates answers. These two approaches are strongly supervised, i.e., only the supporting facts (factoids) are fed to the model as inputs for training the model for each type of question. These methods require a large amount of training data. To tackle this issue, a weakly supervised approach called End-to-End Memory Network (MemN2N) has been proposed. MemN2N is trained end-to-end and uses an attention mechanism to calculate the matching probabilities between the input sentences and questions. The sentences, which match the question with high probability, are used as the factoids for answering the question.

However, this model is capable of generating only single word answers. For example, the answer of the question "According to Andy Hertzfeld, whose idea is the final Mac design closer to?" in FIG. 1 is only one word "Jobs." Since the answers of many questions contain multiple words (for instance, the question labeled 4 in FIG. 1), this model cannot be directly applied to the general question answering tasks.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a long-term memory network that improves question-answering technology.

It is another aspect of the disclosed embodiments to provide for a long-term memory network architecture that combines two neural network architectures, an end-to-end memory network, and a long short-term memory network to generate multiple word answers to textual questions.

It is yet another aspect of the disclosed embodiments to provide for a long-term memory network that can be easily trained end-to-end with minimal data and supervision.

It is still another aspect of the disclosed embodiments to provide for a long-term memory network that can be utilized to extract knowledge from any generic set of articles/publications, given questions pertaining to such articles.

It is another aspect of the disclosed embodiments to provide for a neural network that can learn word embeddings from ontologies and other database.

The aforementioned aspects and other objectives and advantages can now be achieved as described herein. A long-term memory network (LTMN) method and system for text comprehension is disclosed, which includes a recurrent neural network comprising a LSTM (long-short term memory) unit. The recurrent neural network can be configured to encode raw text information into vector representations, form memories, find relevant sentences to answer questions, and generate multi-word answers to the questions utilizing the long-short term memory unit(s).

The LTMN can incorporate both an external memory module and the LSTM units/modules to comprehend the input data and generate multi-word answers. The LTMN can be trained end-to-end using back-propagation and requires minimal supervision.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 1 illustrates an example of a question answering task, in accordance with an example embodiment;

DETAILED DESCRIPTION

Figure 2:
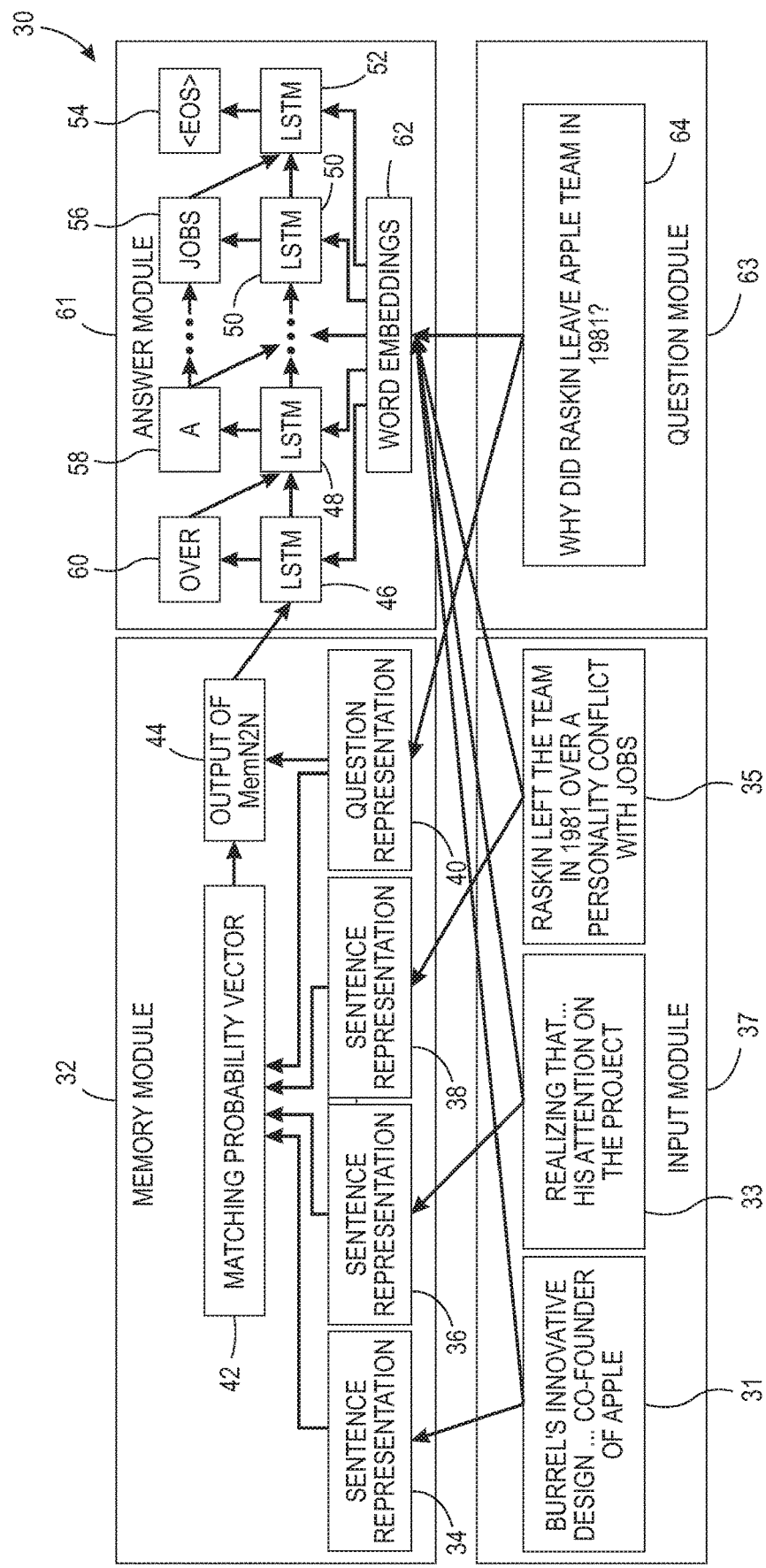
FIG. 2 illustrates a block diagram depicting an LTMN (Long-Term Memory Network), in accordance with an example embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, herein used in the inclusive sense, as well as A, B, or C, herein used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In order to address and offer a solution to the aforementioned problems discussed in the background section of this patent application, a recurrent neural network architecture embodiment, referred to as Long-Term Memory Network (LTMN), can be implemented, which is trained end-to-end, requires minimal supervision during training (i.e., weakly supervised), and generates multiple words answers. In some example embodiments, the disclosed LTMN combines an End-to-End Memory Network (MemN2N) with a Long-Short Term Memory network (LSTM). This example embodiment first embeds the input sentences (which can be initially encoded using, for example, a paragraph2vec model) in a continuous space and stores them in memory. This approach then matches the sentences with the questions, also embedded into the same space, by performing multiple passes through the memory to obtain the factoids which are relevant to each question. These factoids can then be employed to generate the multi-word answer using an LSTM unit.

In order to demonstrate the effectiveness of the LTMN model in generating multi-word answers, a new multi-word answers data set has been generated based on Facebook's bAbI data set. The proposed architecture has also been tested on the Stanford question answering data set (SQuAD). The results, some of which are discussed herein, clearly demonstrate the advantages of the proposed architecture for question answering.

FIG. 2 illustrates a block diagram depicting an LTMN (Long-Term Memory Network) 30, in accordance with an example embodiment. The LTMN 30 shown in FIG. 2 is composed of a number of modules including an input module 37, a question module 63, a memory module 32 (e.g., also referred to as a "memory"), and an answer module 61. The memory module includes a number of sub-modules or units, such as, sentence representation units 34, 36, 38, a question representation unit 40, a matching probability vector unit 42, and a unit 44 representing the output of MemN2N. Output from the matching probability vector unit 42 is provided as input to the unit 44 representing the output of MemN2N. The sentence representation units 34, 36, 38 and the question representation unit 40 provide input to the matching probability vector unit 42. The output representation unit 40 also provides input to unit 44. Note that that the input module 37, the question module 63, and the answer module 61 can also be referred to, respectively, as an input unit 37, a question unit 63, and an answer unit 61.

The input module 37 includes sub-modules or units 31, 33, 35 that provide data (e.g., facts or factoids) that are respectively provided as input to the sentence representation modules 34, 36, 38 and also to a word embeddings unit 62, which is a part of the answer module 61. The question module 63 includes sub-module or unit 64 that provides a question such as, for example, "Why did Raskin leave the Apple team in 1981?" as shown in unit 64. The answer module 61 includes the aforementioned word embeddings unit 62, which provides input to the LSTM module represented by units 46, 48, 50, 52, which produce the output words, shown in units 60, 58, 56, 54.

The LTMN 30 thus includes four modules: input module 37, question module 63, memory module 32, and answer module 61. The input module 37 encodes raw text data (i.e., sentences) into vector representations. Similarly, the question module 63 also encodes questions into vector representations. The respective input and question modules 37 and 63 can use the same or different encoding methods. Given the input sentences' representations, the memory module 32 calculates the matching probabilities between a question representation (e.g., see the question representation unit 40) and the sentence representations (e.g., see the sentence representation units 34, 36, 38), and then outputs the weighted sum of the sentence representations and matching probabilities. Using this weighted sum vector and the question representation, the answer module 61 finally generates the answer for the question.

In order to further describe the operations of the input module 37 and the question module 63, let $\{S_i\}_{i=1}^n$ represent the set of input sentences. Each sentence $s_i$ contains words belonging to a dictionary V and ends with an end-of-sentence token <EOS>. The goal of the input module 37 is to encode sentences into vector representations. There are several ways of encoding the input sentences. For example, an embedding matrix can be employed to embed the sentences in a continuous space and obtain vector representations. Alternatively, a recurrent neural network can be used to encode the input sentences into vector representations. The objective is to learn the co-occurrence and sequence relationships between words in the text in order to generate a coherent sequence of words as answers. The encoded sentences $\{x_i\}_{i=1}^n ; x_i \in \Re^{|V|}$ are then input to the memory module 32. The question module 63 like the input module 37 encodes each question Q into a vector representation $q \in \Re^{|V|}$.

Regarding the memory module 32, the vector representations of input sentences $\{x_i\}_{i=1}^n$ are embedded using a matrix $A = \in \Re^{d \times |V|}$ as $m_i = Ax_i$, $i=1, 2, \ldots, n$; $m_i \in \Re^d$ and stored in memory (note all sentences can be used before the question as input, which implies that the disclosed embodiments are weakly supervised). The question representation q is also embedded using a matrix $B \in \Re^{d \times |V|}$ as $u = Bq; u \in \Re^d$. For the real-world SQuAD dataset that contains a large vocabulary, the paragraph2vec model can be employed to pre-train A and B (with A=B), which takes into account the order and semantics among words to encode the input sentences and questions. For datasets, which are based on a small vocabulary, the embedding matrices A and B can be learnt via back-propagation. The memory module 32 then calculates the matching probabilities between the sentences and the question, by computing the inner product followed by a softmax function as shown in equation (1) below:

$$p_i = \text{Softmax}(u^T m_i) \quad (1)$$

where $\text{Softmax}(z_i) = e^{z_i}/\Sigma_j e^{z_j}$. The probability $p_i$ is expected to be high for all the sentences xi that are related to the question q.

The output of the memory module 32 is a vector $o \in \Re^d$, which can be represented by the sum over input sentence representations, weighted by the matching probability vector as shown in equation (2) below:

$$o = \sum_i p_i m_i \quad (2)$$

This approach, known as the soft attention mechanism, has the benefit of being easy to compute gradients and back-propagate through this function.

Figure 3:
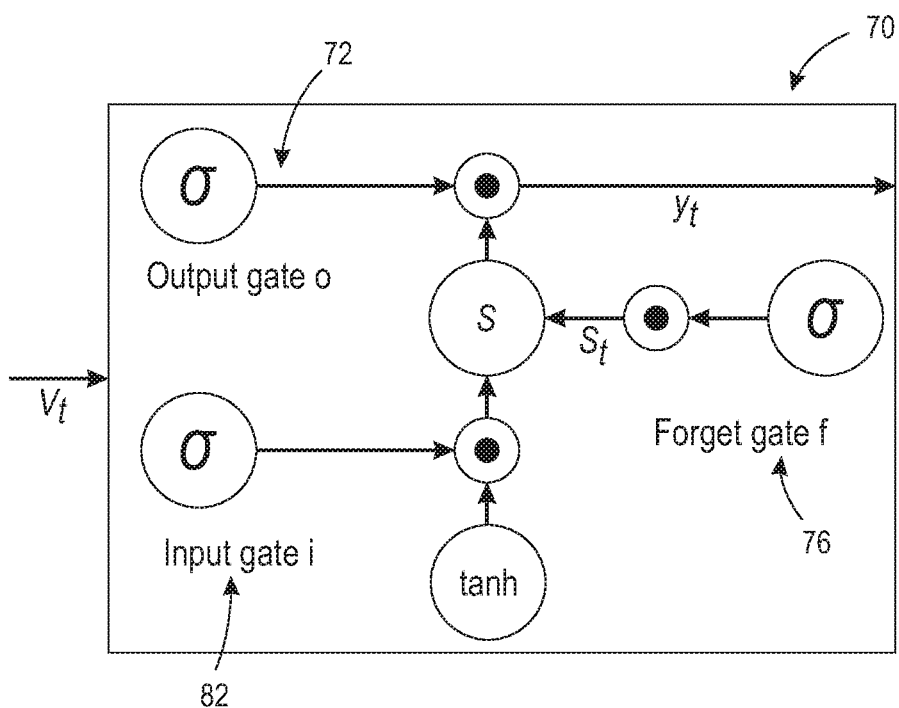
FIG. 3 illustrates a block diagram of an LSTM (Long-Short Term Memory unit), in accordance with an example embodiment.

FIG. 3 illustrates a block diagram of an LSTM (Long-Short Term Memory) unit 70, in accordance with an example embodiment. Regarding the answer module 61, based on the output vector o from the memory module 32 and the word representations from the input module 37, the answer module 61 generates answers for questions. Because one of the objectives of the disclosed embodiments is to generate answers with multiple words, a Long-Short Term Memory network (LSTM) can be used to generate answers.

The LSTM unit 70 forms a part of such a neural network and the core of the LSTM neural network is a memory unit whose behavior can be controlled by a set of three gates: input, output, and forget gates as shown in FIG. 3. That is, the LSTM unit 70 includes an output gate 72, an input gate 82, and a forget gate 76. The memory unit 70 accumulates the knowledge from the input data at each time step, based on the values of the gates, and stores this knowledge in its internal states. The initial input to the LSTM unit 70 is the embedding of the begin-of-answer (<BOA>) token and its state. The output of the memory module o, the question representation u, a weight matrix $W^{(o)}$, and bias $b_o$ can be used to generate the embedding of <BOA> $a_o$ as shown in equation (3) below:

$$a_o = \text{Softmax}(W^{(o)}(o+u)+b_o).$$

Using $a_o$ and the initial state $s_o$, the LSTM unit 70 can generate the first word $w_1$ and its corresponding predicted output $y_1$ and state $s_1$. At each time step t, the LSTM unit 70 takes the embedding of word $w_{t-1}$ and the last hidden state $s_{t-1}$ as input to generate the word $w_t$ as shown in equations (4) to (10) below:

$$v_t = [w_{t-1}] \quad (4)$$

$$i_t = \sigma(W_{iv}v_t + W_{im}y_{t-1} + b_i) \quad (5)$$

$$f_t = \sigma(W_{fv}v_t + W_{fm}y_{t-1} + b_f) \quad (6)$$

$$o_t = \sigma(W_{ov}v_t + W_{om}y_{t-1} + b_o) \quad (7)$$

$$s_t = f_t \odot s_{t-1} + i_t \odot \tan h(W_{sv}v_t + W_{sm}y_{t-1}) \quad (8)$$

$$y_t = o_t \odot s_t \quad (9)$$

$$w_t = \arg\max \text{Softmax}(W^{(t)}y_t + b_t) \quad (10)$$

where $|w_t|$ is the embedding of word $w_t$ learned from the input module 37, $\sigma$ and $\odot$ denote the sigmoid function and Hadamard product respectively, and $W^{(t)}$ is a weight matrix and $b_t$ is a bias vector.

The model can be trained end-to-end with the loss defined by the cross-entropy between the true answer and the predicted output $w_t$, represented using one-hot encoding. Concatenating all the words generated by the model can generate the predicted answer.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example, a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
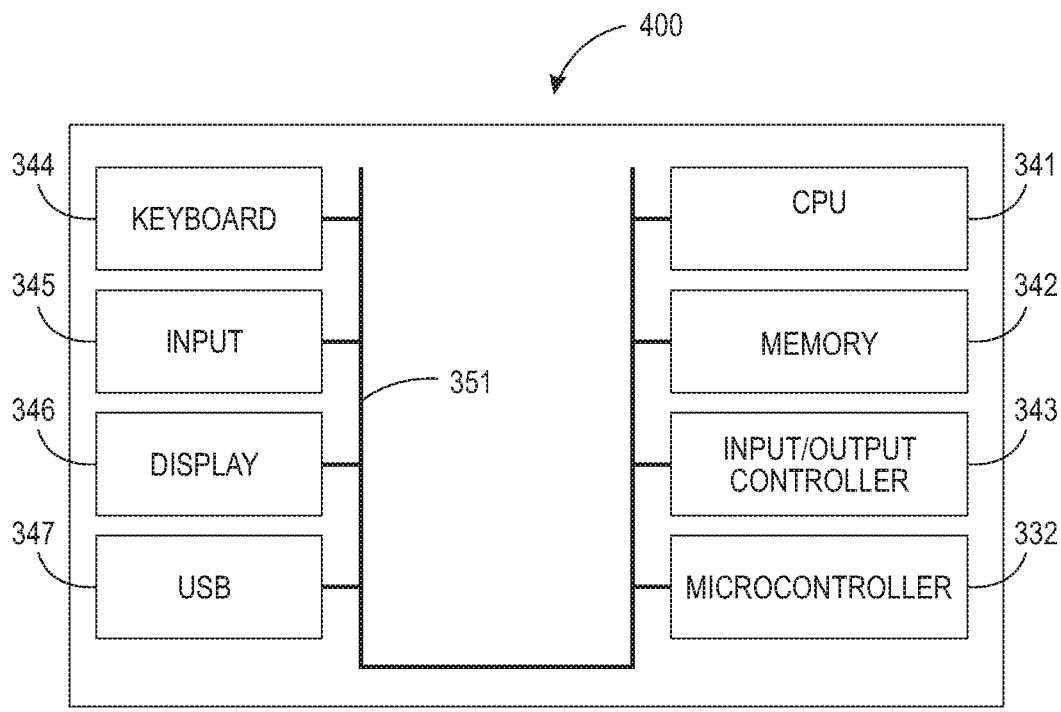
FIG. 4 illustrates a schematic view of a computer system, in accordance with an embodiment.
Figure 5:
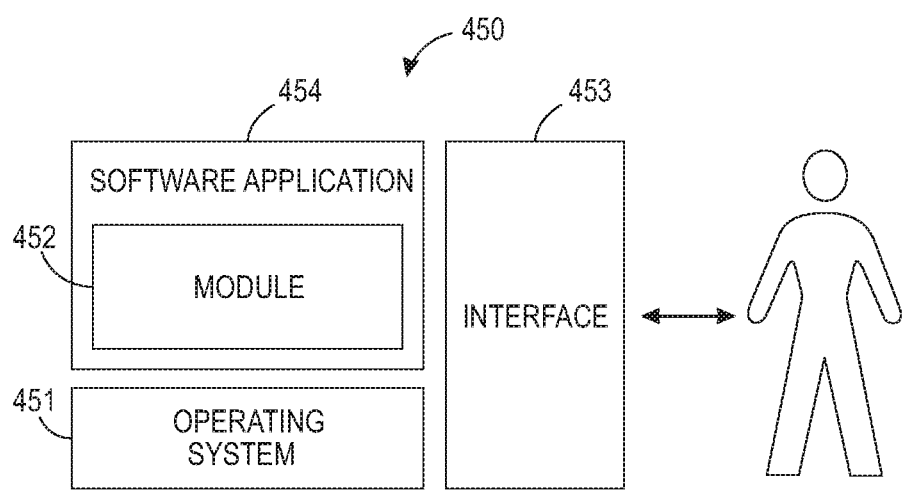
FIG. 5 illustrates a schematic view of a software system including a module, an operating system, and a user interface, in accordance with an embodiment.

FIGS. 4-5 are shown only as exemplary diagrams of data-processing environments in which embodiments may be implemented. It should be appreciated that FIGS. 4-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As Illustrated in FIG. 4, some embodiments may be implemented in the context of a data-processing system 400 that can include one or more processors such as a processor 341 (e.g., a CPU (Central Processing Unit) and/or other microprocessor), a memory 342, an input/output controller 343, a microcontroller 332, a peripheral USB (Universal Serial Bus) connection 347, a keyboard 344 and/or another input device 345 (e.g., a pointing device, such as a mouse, track ball, pen device, etc.), and a display 346.

As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. Data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device, and so on, wherein each such device is operably connected to and/or in communication with a client-server based network or other types of networks (e.g., cellular networks, Wi-Fi, etc.).

FIG. 5 illustrates a computer software system 450 for directing the operation of the data-processing system 400 depicted in FIG. 4. Software application 454, stored for example in memory 342, generally includes a module. The computer software system 450 includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user may supply additional inputs or terminate a session. The software application 454 can include module(s) 452, which can, for example, implement instructions or operations such as those discussed herein with respect to FIGS. 1-3. Examples of module(s) 452 include, for example, the memory module 32, the answer module 61, the question module 63, and the input module 37 depicted in FIG. 2 and the LSTM unit/module 70 shown in FIG. 3.

The following discussion is intended to provide a brief, general description of suitable computing environments in which the system and method may be implemented. Although not required, the disclosed embodiments will be described in the general context of computer-executable instructions, such as program modules being executed by a single computer. In most instances, a "module" constitutes a software application.

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 4-5 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

The claims, description, and drawings of this application may describe one or more of the instant technologies in operational/functional language, for example, as a set of operations to be performed by a computer. Such operational/functional description in most instances can be specifically-configured hardware (e.g., because a general purpose computer in effect becomes a special-purpose computer once it is programmed to perform particular functions pursuant to instructions from program software). Note that the data-processing system 400 discussed herein may be implemented as special-purpose computer in some example embodiments. In some example embodiments, the data-processing system 400 can be programmed to perform the aforementioned particular instructions thereby becoming in effect a special-purpose computer.

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein can be a distillation of machine specifications or other physical mechanisms specified by the operations/functions such that the otherwise inscrutable machine specifications may be comprehensible to the human mind. The distillation also allows one skilled in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions are representative of static or sequenced specifications of various hardware elements. This is true because tools available to implement technical disclosures set forth in operational/functional formats—tools in the form of a high-level programming language (e.g., C, Java, Visual Basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. In order to facilitate human comprehension, in many instances, high-level programming languages resemble or even share symbols with natural languages.

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In an example embodiment, if a high-level programming language is the tool used to implement a technical disclosure in the form of functions/operations, it can be understood that, far from being abstract, imprecise, "fuzzy," or "mental" in any significant semantic sense, such a tool is instead a near incomprehensibly precise sequential specification of specific computational—machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory devices, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output.

The Instruction Set Architecture includes a specification of the machine language that can be used by programmers to use/control the microprocessor. Since the machine language instructions are such that they may be executed directly by the microprocessor, typically they consist of strings of binary digits or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language Instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction and some personal computers execute more than two billion instructions every second).

Thus, programs written in machine language—which may be tens of millions of machine language instructions long—are incomprehensible. In view of this, early assembly languages were developed that used mnemonic codes to refer to machine language instructions rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification, which selects out hardware logic gates, specifies voltage levels, voltage transition timings, etc., such that the humanly useful work is accomplished by the hardware.

Thus, a functional/operational technical description, when viewed by one skilled in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. Accordingly, any such operational/functional technical descriptions may be understood as operations made into physical reality by: (a) one or more interchained physical machines; (b) interchained logic gates configured to create one or more physical machine(s) representative of sequential/combinatorial logic(s); (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s); or (d) virtually any combination of the foregoing. Indeed, any physical object, which has a stable, measurable, and changeable state may be used to construct a machine based on the above technical description. Charles Babbage, for example, constructed the first computer out of wood and powered by cranking a handle.

Thus, far from being understood as an abstract idea, it can be recognized that a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc., with natural language simply cannot be taken as an indication that such functional/operational technical descriptions are abstract ideas or mere expressions of abstract ideas. In fact, as outlined herein, in the technological arts this is simply not true. When viewed through the tools available to those skilled in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person skilled in the art in understanding the described subject matter by providing a description that is more or less independent of any specific vendor's piece(s) of hardware.

The use of functional/operational technical descriptions assists the person skilled in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person skilled in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those skilled in the art by separating the technical descriptions from the conventions of any vendor-specific piece of hardware.

In view of the foregoing, the logical operations/functions set forth in the present technical description are representative of static or sequenced specifications of various ordered-matter elements in order that such specifications may be comprehensible to the human mind and adaptable to create many various hardware configurations. The logical operations/functions disclosed herein should be treated as such, and should not be disparagingly characterized as abstract ideas merely because the specification they represent are presented in a manner that one skilled in the art can readily understand and apply in a manner independent of a specific vendors hardware implementation.

At least a portion of the devices or processes described herein can be integrated into an information processing system. An information processing system generally includes one or more of a system unit housing, a video display device, memory such as volatile or non-volatile memory, processors such as microprocessors or digital signal processors, computational entities such as operating systems, drivers, graphical user interfaces, applications programs, one or more interaction devices (e.g., a touch pad, a touch screen, an antenna, etc.), or control systems including feedback loops and control motors (e.g., feedback for detecting position or velocity, control motors for moving or adjusting components or quantities). An information processing system can be implemented utilizing suitable commercially available components, such as those typically found in data computing/communication or network computing/communication systems.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes or systems or other technologies described herein can be effected (e.g., hardware, software, firmware, etc., in one or more machines or articles of manufacture), and that the preferred vehicle will vary with the context in which the processes, systems, other technologies, etc., are deployed. For example, if an implementer determines that speed and accuracy are paramount, the implementer may opt for a mainly hardware or firmware vehicle; alternatively, if flexibility is paramount, the implementer may opt for a mainly software implementation that is implemented in one or more machines or articles of manufacture; or, yet again alternatively, the implementer may opt for some combination of hardware, software, firmware, etc., in one or more machines or articles of manufacture. Hence, there are several possible vehicles by which the processes, devices, other technologies, etc., described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. In an embodiment, optical aspects of implementations will typically employ optically-oriented hardware, software, firmware, etc., in one or more machines or articles of manufacture.

The herein described subject matter sometimes illustrates different components contained within, or connected with, different other components. It is to be understood that such depicted architectures are merely examples, and that in fact, many other architectures can be implemented that achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures, or intermedial components. Likewise, any two components so associated can also be viewed as being "operably connected" or "operably coupled" to each other to achieve the desired functionality, and any two components capable of being so associated can also be viewed as being "operably coupleable" to each other to achieve the desired functionality. Specific examples of operably coupleable include, but are not limited to, physically mateable, physically interacting components, wirelessly interactable, wirelessly interacting components, logically interacting, logically interactable components, etc.

In an example embodiment, one or more components may be referred to herein as "configured to," "configurable to," "operable/operative to," "adapted/adaptable," "able to," "conformable/conformed to," etc. Such terms (e.g., "configured to") can generally encompass active-state components, or inactive-state components, or standby-state components, unless context requires otherwise.

The foregoing detailed description has set forth various embodiments of the devices or processes via the use of block diagrams, flowcharts, or examples. Insofar as such block diagrams, flowcharts, or examples contain one or more functions or operations, it will be understood by the reader that each function or operation within such block diagrams, flowcharts, or examples can be implemented, individually or collectively, by a wide range of hardware, software, firmware in one or more machines or articles of manufacture, or virtually any combination thereof. Further, the use of "Start," "End," or "Stop" blocks in the block diagrams is not intended to indicate a limitation on the beginning or end of any functions in the diagram. Such flowcharts or diagrams may be incorporated into other flowcharts or diagrams where additional functions are performed before or after the functions shown in the diagrams of this application. In an embodiment, several portions of the subject matter described herein is implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software and/or firmware would be well within the skill of one skilled in the art in light of this disclosure. In addition, the mechanisms of the subject matter described herein are capable of being distributed as a program product in a variety of forms, and that an illustrative embodiment of the subject matter described herein applies regardless of the particular type of signal-bearing medium used to actually carry out the distribution. Non-limiting examples of a signal-bearing medium include the following: a recordable type medium such as a floppy disk, a hard disk drive, a Compact Disc (CD), a Digital Video Disk (DVD), a digital tape, a computer memory, etc.; and a transmission type medium such as a digital or an analog communication medium (e.g., a fiber optic cable, a waveguide, a wired communications link, a wireless communication link (e.g., transmitter, receiver, transmission logic, reception logic, etc.), etc.).

While particular aspects of the present subject matter described herein have been shown and described, it will be apparent to the reader that, based upon the teachings herein, changes and modifications can be made without departing from the subject matter described herein and its broader aspects and, therefore, the appended claims are to encompass within their scope all such changes and modifications as are within the true spirit and scope of the subject matter described herein. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is Intended in the sense of the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense of the convention (e.g., "a system having at least one of A, B, or C" would include but not be limited to systems that have A alone, B alone, C alone, A and B together, A and C together, B and C together, and/or A, B, and C together, etc.). Typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, the operations recited therein generally may be performed in any order. Also, although various operational flows are presented in a sequence(s), it should be understood that the various operations may be performed in orders other than those that are illustrated, or may be performed concurrently. Examples of such alternate orderings include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Based on the foregoing, it can be appreciated that text comprehension is an important and challenging task in natural language processing, especially for the question-answering task. Traditional question answering approaches mainly use information retrieval techniques or knowledge bases to extract answers, and are not capable of understanding the meaning of text and reasoning over the available information. Deep neural networks using memory components can be used to solve this issue. The disclosed Long-Term Memory Network is based on a novel recurrent neural network, which can encode raw text information (e.g., the input sentences and questions) into vector representations, form memories, find relevant sentences to answer the questions, and finally generate multiword answers using a long short term memory network. The disclosed architecture is a weakly supervised model and can be trained end-to-end.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A long-term memory network method for text comprehension, said method comprising:
   providing a recurrent neural network that includes an external memory and a long-short term memory unit, wherein said recurrent neural network encodes raw text information into vector representations, forms memories, finds relevant sentences to answer questions, and generates multi-word answers to said questions utilizing said long-short term memory unit; and
   controlling the long-short term memory unit with a set of three gates comprising an input gate, an output gate and a forget gate, wherein the long-short term memory unit accumulates knowledge from input data at each time step among a plurality of time steps and based on values of the input gate, the output gate, and the forget gate, stores the knowledge in internal states,
   wherein said raw text information comprises input sentences and questions and wherein the long-term memory network combines an End-to-End Memory Network (MemN2N) with a Long-Short Term Memory network, wherein the Long-Short Term Memory network includes the long-short term memory unit and wherein said recurrent neural network comprises a weakly supervised architecture, and
   wherein the long-short term memory unit includes a memory module comprising a plurality of sub-units including a plurality of sentence representation units, a question representation unit, a matching probability vector unit, and a unit representing the output of the MemN2N, wherein output from the matching probability vector unit is provided as input to the unit representing the output of the MemN2N.

2. The method of claim 1 wherein said input sentences comprise at least one sentence containing a word belonging to a dictionary and ending with an end-of-sentence token.

3. The method of claim 1 wherein said recurrent neural network is trained in an end-to-end manner.

4. The method of claim 1 wherein said recurrent neural network is trained in an end-to-end manner with a loss defined by a cross-entropy between a true answer and a predicted output, wherein the predicted output is represented using one-hot encoding.

5. The method of claim 1 wherein said recurrent neural network further comprises a memory module, an answer module, a question module, and an input module, wherein the memory module calculates matching probabilities the input sentences and the questions by computing an inner product followed by a softmax function.

6. The method of claim 5 wherein said answer module includes said long-short term memory unit.

7. The method of claim 1 wherein said vector representations include a matching probability vector.

8. A long-term memory system for text comprehension, said system comprising:
   a recurrent neural network that comprises an external memory and a long-short term memory unit, wherein said recurrent neural network encodes raw text information into vector representations, forms memories, finds relevant sentences to answer questions, and generates multi-word answers to said questions utilizing said long-short term memory unit; and
   wherein the long-short term memory unit is controlled by a set of three gates comprising an input gate, an output gate, and a forget gate and wherein the long-short term memory unit accumulates knowledge from input data at each time step among a plurality of time steps and based on values of the input gate, the output gate, and the forget gate, stores the knowledge in internal states,
   wherein said raw text information comprises input sentences and questions and wherein the long-term memory network combines an End-to-End Memory Network (MemN2N) with a Long-Short Term Memory network, wherein the Long-Short Term Memory network includes the long-short term memory unit, and,
   wherein said recurrent neural network comprises a weakly supervised architecture and wherein the long-short term memory unit includes a memory module comprising a plurality of sub-units including a plurality of sentence representation units, a question representation unit, a matching probability vector unit, and a unit representing the output of the MemN2N, wherein output from the matching probability vector unit is provided as input to the unit representing the output of the MemN2N.

9. The system of claim 8 wherein said input sentences comprise at least one sentence containing a word belonging to a dictionary and ending with an end-of-sentence token.

10. The system of claim 9 wherein said recurrent neural network is trained in an end-to-end manner.

11. The system of claim 8 wherein said recurrent neural network is trained in an end-to-end manner with a loss defined by a cross-entropy between a true answer and a predicted output, wherein the predicted output is represented using one-hot encoding.

12. The system of claim 8 wherein said recurrent neural network further comprises a memory, an answer unit, a question unit, and an input unit, wherein the memory calculates matching probabilities the input sentences and the questions by computing an inner product follows by a softmax function.

13. The system of claim 12 wherein said answer unit includes said long-short term memory unit.

14. The system of claim 8 wherein said vector representations include a matching probability vector.

15. A long-term memory network system for text comprehension, said system comprising:
- at least one processor; and
- a computer-usable medium embodying computer program code, said computer-usable medium capable of communicating with said at least one processor, said computer program code comprising instructions executable by said at least one processor and configured for:
  - configuring a recurrent neural network with an external memory and long-short term memory unit; and instructing said recurrent neural network to encode raw text information into vector representations, form memories, find relevant sentences to answer questions, and generate multi-word answers to said questions utilizing said long short term memory unit; and
  - controlling the long-short term memory unit with a set of three gates comprising an input gate, an output gate and a forget gate, wherein the long-short term memory unit accumulates knowledge from input data at each time step among a plurality of time steps and based on values of the input gate, the output gate, and the forget gate, stores the knowledge in internal states,
- wherein said raw text information comprises input sentences and questions, and wherein the long-term memory network combines an End-to-End Memory Network (MemN2N) with a Long-Short Term Memory network, wherein the Long-Short Term Memory network includes the long-short term memory unit, and
- wherein said recurrent neural network comprises a weakly supervised architecture and wherein the long-short term memory unit includes a memory module comprising a plurality of sub-units including a plurality of sentence representation units, a question representation unit, a matching probability vector unit, and a unit representing the output of the MemN2N, wherein output from the matching probability vector unit is provided as input to the unit representing the output of the MemN2N.

16. The system of claim 15 wherein input sentences comprise at least one sentence containing a word belonging to a dictionary and ending with an end-of-sentence token.

17. The system of claim 16 wherein said recurrent neural network is trained in an end-to-end manner.

18. The system of claim 15 wherein said recurrent neural network is trained in an end-to-end manner with a loss defined by a cross-entropy between a true answer and a predicted output, wherein the predicted output is represented using one-hot encoding.

19. The system of claim 15 wherein said recurrent neural network further comprises a memory, an answer unit, a question unit, and an input and wherein said answer unit includes said long-short term memory unit, wherein the memory calculates matching probabilities the input sentences and the questions by computing an inner product followed by a softmax function.

20. The system of claim 19 wherein said vector representations include a matching probability vector.

* * * * *